R. J. F. & A. E. ALDRED.
DOUGH MOLDING MACHINE.
APPLICATION FILED NOV. 1, 1909.

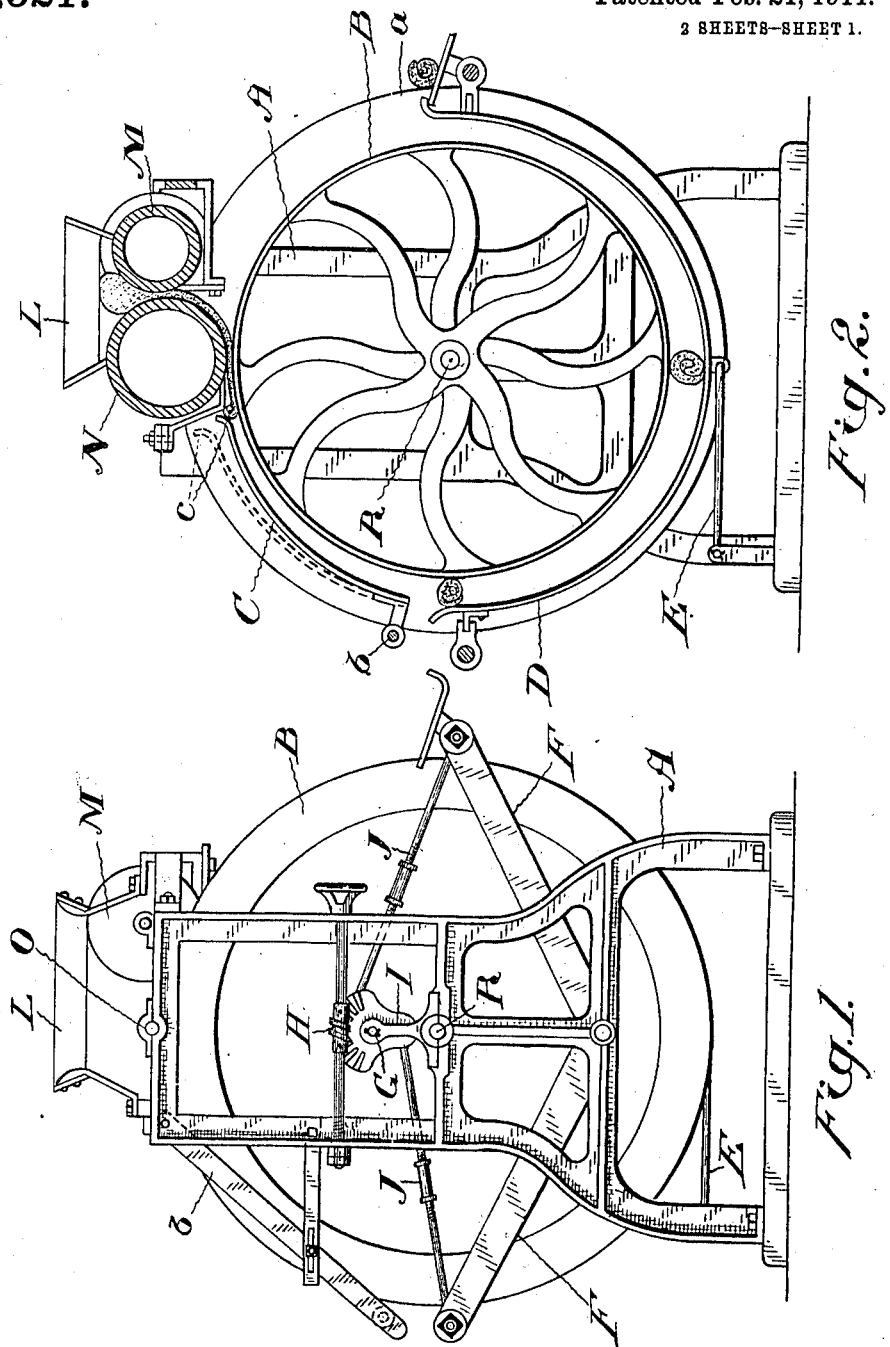

984,521.

Patented Feb. 21, 1911.
2 SHEETS—SHEET 2.

WITNESSES:

INVENTORS
Robert J. F. Aldred
BY Alfred E. Aldred
Ridout & Maybee
ATTORNEYS

UNITED STATES PATENT OFFICE.

ROBERT J. F. ALDRED AND ALFRED E. ALDRED, OF GLENCOE, ONTARIO, CANADA.

DOUGH-MOLDING MACHINE.

984,521.  Specification of Letters Patent.  Patented Feb. 21, 1911.

Application filed November 1, 1909. Serial No. 525,794.

*To all whom it may concern:*

Be it known that we, ROBERT J. F. ALDRED and ALFRED E. ALDRED, of Glencoe, in the Province of Ontario, Canada, have invented certain new and useful Improvements in Dough-Molding Machines, of which the following is a specification.

This invention relates to dough molding machines of the type in which the dough is reduced to a sheet, formed into a spiral roll and finally reduced and rolled into a cylindrical loaf. The forming and rolling takes place usually between a "curler" and a large rotary drum and between the drum and a flexible concave plate and our object is to devise means for feeding the dough between the drum and the curler in a sheet narrower than the drum, of substantially even thickness from side to side, and having even clear-cut edges; a second object is to devise simple and effective means for adjusting the flexible concave plate to and from the drum.

We attain our objects by providing the machine with a hopper feeding to two rollers, M and N, one roller, M, having flanges between which the other fits. The plain roller N is set close to the drum to hold the sheet of dough passing from between the rollers against the drum and feed it between the drum and the curler.

The flexible concave plate is held at the bottom by a substantially horizontal pivoted link. Its ends are connected to links pivoted on a common center and operated from a screw actuated shaft to vary the distance of the plate from the peripheral surface of the drum.

Figure 3:
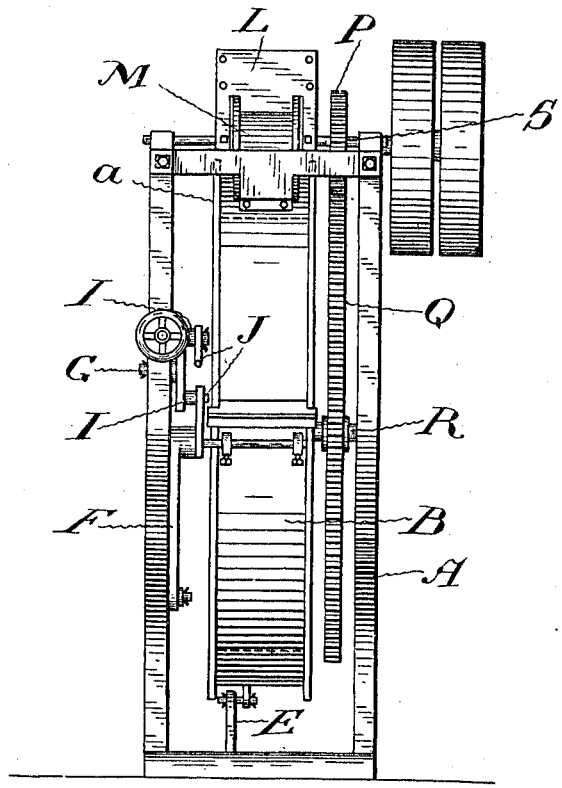
Figure 4:
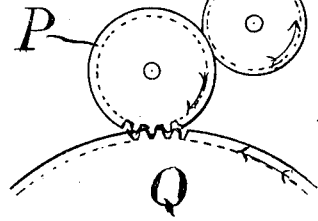

Figure 1 is a front elevation of our improved machine. Fig. 2 is a vertical longitudinal section of the same. Fig. 3 is a side elevation. Fig. 4 is a diagrammatic view in elevation of the gearing for rotating the feed rollers and drum.

In the drawings like letters of reference indicate corresponding parts in the different figures.

A is the frame of the machine suitably shaped to support the different parts. In this frame is journaled the drum B provided with the flanges a. With this drum coöperates the curved curler plate C. This is pivoted on the frame b and by its weight tends to lie in contact with the drum B.

Around the lower part of the drum is fitted the flexible concave plate D, this plate being spaced from the periphery of the drum. Ordinarily the plate will be closer to the drum at the end farthest from the curler plate C. The distance of this curler plate from the drum is, however, adjustable in the following manner: A link E is pivotally connected to the frame of the machine and to the center of the under side of the plate D. This link will thus hold the plate against displacement longitudinally of the machine while permitting its vertical adjustment. The ends of the plate are connected to the arms F which are pivotally connected to the frame of the machine preferably on a common center. By swinging these arms the flexible concave plate D may be adjusted to and from the drum to suit the size of the loaves being molded. This adjustment is preferably made by means of a rock shaft G which may be actuated by the worm gearing H. This rock shaft is provided with rock arms I which are connected by means of the connecting rods J to the ends of the arms F. It is evident that by actuating the worm gearing the arms F will be actuated to adjust the flexible concave plate D as hereinbefore described.

The operation of the machine, so far as we have described it, is as follows: If a sheet of dough be fed in by the roller N between the curler plate C and the drum B, the forward edge of the sheet will contact with the outwardly turned end c of this plate and the sheet of dough will be curled up into a spiral roll, as shown, which spiral roll is rolled out into a cylindrical loaf between the drum B and the plate D and finally discharged on to the table A. To obtain good results the dough must be fed to the curler plate in a comparatively even sheet of even thickness throughout with even clear-cut edges and the mechanism we will now describe provides such a feed.

A hopper L is located at the top of the machine which hopper fits between the flanges of the flanged roller. These two rollers are considerably less in width than the width of the drum B and close to the forward end c of the curler plate C. The two rollers take the dough from the hopper L into which it is fed in lumps of the proper size and feed it in such a sheet as described between the roller N and the drum B. The roller N holds the sheet of dough down against the periphery of the drum B so that it cannot crinkle or bend it when it meets the endwise pressure caused by its entrance between the curler plate C and the drum B. The dough is thus pushed smoothly and evenly forward as it is curled.

The usual flour sifter may be provided on top of the machine, but as this forms no part of the present invention it is neither illustrated nor described.

Both the curler and the periphery of the drums are preferably faced with canvas to give them a suitable grip on the dough. The various parts are driven as follows: On the shaft R of the drum B is secured a gear wheel Q which is actuated by the gear P secured to the shaft O of the plain roller N, which shaft is provided with the usual driving and loose pulleys as shown. By these means the drum B and plain roller N both rotate in the same direction. The flange roller M which coacts with the plain roller N to feed the dough to the drum is rotated in an opposite direction to the plain roller N by means of the gear pinion S mounted on its shaft and meshing with the gear P mounted on the shaft of the plain roller N (see Fig. 4).

What I claim as my invention is:

1. In a dough molding machine the combination of a molding means comprising a rotary drum; and a curved curler plate coöperating with the drum to curl the dough, with feeding means comprising a flanged roller less in width than the periphery of the drum; and a plain roller coöperating therewith to shape the dough into a thin sheet, the plain roller also being set to coöperate with the drum to feed the sheet of dough between said roller and drum and thence between the curler-plate and the periphery of said drum.

2. In a dough molding machine the combination of a molding means comprising a rotary drum and a curved curler plate coöperating with the drum to curl the dough, with feeding means comprising a flanged roller less in width than the periphery of the drum; and a plain roller coöperating therewith to shape the dough into a thin sheet, the plain roller also being set to coöperate with the drum to feed the sheet of dough between said roller and drum and thence between the curler-plate and the periphery of said drum; and a hopper adapted to feed dough between the two rollers.

3. In a dough molding machine the combination of a molding means comprising a rotary drum; and a curved curler plate coöperating with the drum to curl the dough, with feeding means comprising a roller less in width than the periphery of the drum; and a roller coöperating therewith to shape the dough into a thin sheet, the latter roller also being set to coöperate with the drum to feed the sheet of dough between said roller and drum and thence between the curler-plate and the periphery of said drum.

4. In a dough molding machine the combination of a rotary drum and a flexible concave plate coöperating therewith at its lower side; a substantially horizontal link pivotally connected to the center of the concave plate and to the frame of the machine; arms pivoted to the ends of the flexible plate and on the same center on the frame of the machine below and in substantially the same vertical plane as the center of the drum; and means for rocking said arms.

5. In a dough molding machine the combination of a rotary drum and a flexible concave plate coöperating therewith at its lower side; a substantially horizontal link pivotally connected to the center of the concave plate and to the frame of the machine; arms pivoted to the ends of the flexible plate and on the same center on the frame of the machine below and in substantially the same vertical plane as the center of the drum; means for rocking said arms, comprising a rock-shaft, rock-arms connected thereto, and connections between the rock-arms and the arms supporting the ends of the concave plate.

Glencoe, this fifth day of October 1909.

ROBERT J. F. ALDRED.
ALFRED E. ALDRED.

Signed in the presence of—
WM. D. Moss,
LILA HURLEY.